United States Patent
Amirpour et al.

(10) Patent No.: US 9,460,132 B2
(45) Date of Patent: Oct. 4, 2016

(54) MOTOR VEHICLE INSPECTION DEVICE AND METHOD FOR IDENTIFYING MOTOR VEHICLES

(75) Inventors: Ramon Amirpour, Ebersbach (DE); Guenter Nobis, Nuertingen (DE); Roger Malmsheimer, Allmersbach Im Tal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 282 days.

(21) Appl. No.: 13/822,177

(22) PCT Filed: Jul. 20, 2011

(86) PCT No.: PCT/EP2011/062427
§ 371 (c)(1),
(2), (4) Date: May 24, 2013

(87) PCT Pub. No.: WO2012/031812
PCT Pub. Date: Mar. 15, 2012

(65) Prior Publication Data
US 2013/0238670 A1 Sep. 12, 2013

(30) Foreign Application Priority Data
Sep. 10, 2010 (DE) .................. 10 2010 040 550

(51) Int. Cl.
*G06F 17/30* (2006.01)
*G01M 17/007* (2006.01)
*G07C 5/08* (2006.01)

(52) U.S. Cl.
CPC ...... *G06F 17/30312* (2013.01); *G01M 17/007* (2013.01); *G06F 17/30722* (2013.01); *G07C 5/0858* (2013.01)

(58) Field of Classification Search
CPC .................. G06F 1730/554; G06F 1730/386; G06F 1730/634–1730/693; G06F 1730/694–1730/991; G06F 17/30312
USPC ........................................................ 707/812
See application file for complete search history.

(56) References Cited

U.S. PATENT DOCUMENTS

| 4,922,443 | A | 5/1990 | Coetsier et al. |
| 6,336,079 | B1 * | 1/2002 | Knestel .................. 702/123 |

(Continued)

FOREIGN PATENT DOCUMENTS

| CN | 1527934 | 9/2004 |
| CN | 101382470 | 3/2009 |

(Continued)

*Primary Examiner* — Syed Hasan
*Assistant Examiner* — Saba Ahmed
(74) *Attorney, Agent, or Firm* — Norton Rose Fulbright US LLP

(57) ABSTRACT

A method for identifying a motor vehicle for a plurality of motor vehicle inspection devices, including ascertaining a distinct characteristic of the motor vehicle; ascertaining basic identification data of the motor vehicle; storing the distinct characteristic and the basic identification data in an identification data set for this motor vehicle on a storage medium; identifying the identification data set associated with the motor vehicle on the storage medium based on the distinct characteristic with a first of the plurality of motor vehicle inspection devices; reading out the identified identification data set of the motor vehicle from the storage medium; ascertaining first identification data of the motor vehicle, which are specific to the first of the plurality of motor vehicle inspection devices; supplementing the read-out identification data set by the first identification data; storing the supplemented identification data set on the storage medium; identifying the identification data set associated with the motor vehicle on the storage medium based on the distinct characteristic with a second of the plurality of motor vehicle inspection devices; reading out the identified identification data set of the motor vehicle from the storage medium; ascertaining second identification data of the motor vehicle, which are specific for the second of the plurality of motor vehicle inspection devices; supplementing the read-out identification data set by the second identification data; and storing the supplemented identification data set on the storage medium.

11 Claims, 5 Drawing Sheets

(56) References Cited

U.S. PATENT DOCUMENTS

| | | | |
|---|---|---|---|
| 8,089,340 B2* | 1/2012 | Cochran et al. | 382/115 |
| 8,305,442 B2* | 11/2012 | Millar | 348/148 |
| 8,555,073 B2* | 10/2013 | Paeschke et al. | 713/176 |
| 8,620,487 B2* | 12/2013 | Cochran et al. | 701/1 |
| 2006/0006982 A1* | 1/2006 | Gunsauley | 235/375 |
| 2008/0147246 A1* | 6/2008 | Cochran et al. | 713/186 |
| 2011/0093515 A1* | 4/2011 | Albanese | 707/812 |

FOREIGN PATENT DOCUMENTS

| | | |
|---|---|---|
| DE | 196 15 008 | 10/1997 |
| DE | 199 42 844 | 4/2001 |
| EP | 0 306 362 | 3/1989 |
| EP | 1 083 421 | 3/2001 |
| EP | 2 166 514 | 3/2010 |
| GB | 2 421 807 | 7/2006 |

* cited by examiner

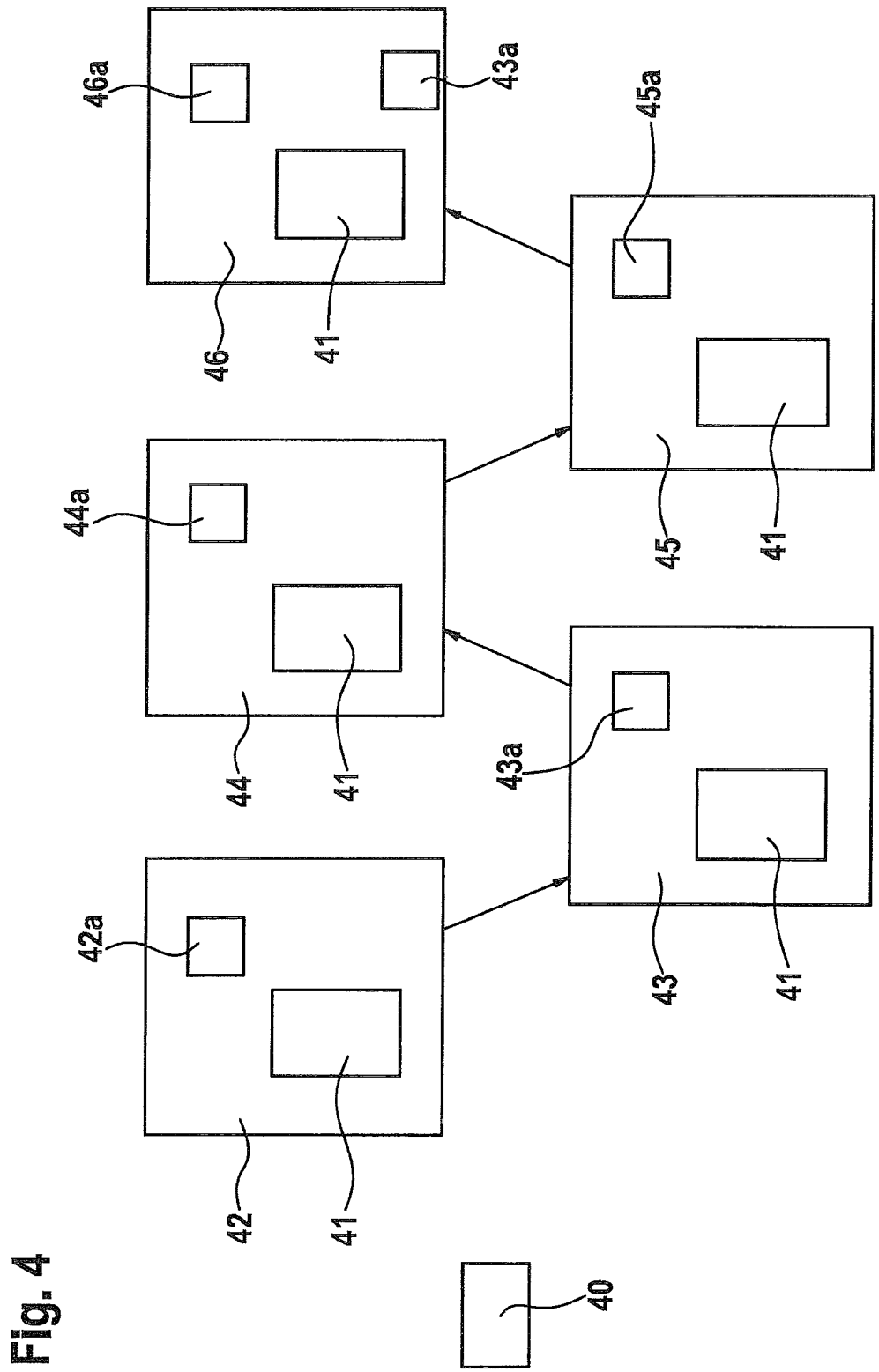

MOTOR VEHICLE INSPECTION DEVICE AND METHOD FOR IDENTIFYING MOTOR VEHICLES

FIELD OF THE INVENTION

The present invention relates to a method for identifying motor vehicles for motor vehicle inspection devices, a motor vehicle inspection device, and a system for identifying motor vehicles.

BACKGROUND INFORMATION

Unexamined patent application DE 199 42 844 A1 discusses a system for identifying motor vehicles during the inspection in a test lane.

Publication EP 0 306 362 B1 discusses a system for detecting and processing data for the inspection of motor vehicles.

In a motor vehicle repair shop, a motor vehicle inspection station, or a comparable facility, the data for identifying a specific motor vehicle are contained in different inspection device-specific databases in today's motor vehicle inspection devices. These inspection devices are usually geared to the task which the particular inspection device must fulfill. In this case, inspection devices include, for example, engine testers, control unit diagnostic testers, emission testers, axle measurement testers, and the like. Each of these inspection devices has in its database its own individual identification characteristics for motor vehicles relating to those aspects which are significant for the particular inspection activity.

The individual identification characteristics, which relate to the identification of the motor vehicle for the particular inspection devices, also have an effect on a specific portion of the user interface; therefore, these portions of the user interface also differ among the inspection devices.

In a repair shop or an inspection station, an employee or technician must identify the motor vehicle anew on each inspection device. Here, under certain circumstances, all identification data which have already been used in one of the previous inspection steps must be collected anew. Furthermore, the employee must be familiar with the particular operation and handling of every inspection device.

SUMMARY OF THE INVENTION

The exemplary embodiments and/or exemplary embodiments of the present invention are based on the aspect of dividing the identification of a motor vehicle into a basic identification, which is uniform for all inspection devices, and a subsequent identification, which is specific to the particular inspection devices used, and to further use the collected identification data in subsequent working steps during a repair shop visit if multiple different inspection devices are used. During the identification of a motor vehicle, the basic identification is thus always the first identification step for each inspection device which may be advantageously carried out using a standardized user interface. For this purpose, the basic identification is advantageously carried out for each specific motor vehicle right at the beginning of a repair shop visit or inspection procedure.

Within one inspection procedure, the additional subsequent identification is carried out for other inspection devices as needed, i.e., only those identification data are additionally collected which are in fact additionally needed at this point in time for the particular inspection device. In this way, the identification process of the motor vehicle is advantageously divided up between multiple working steps and workstations using different inspection devices, thus making it possible to significantly reduce the proportionate time and labor for identifying the motor vehicle at different inspection devices.

For this purpose, the method according to the present invention according to the description herein initially includes ascertaining basic identification data of a motor vehicle. This means that there is a uniform basic identification across all inspection devices which includes a uniform vehicle-specific key for data-related reasons. This data-based vehicle key represents a bridge to the inspection device-specific databases for the different inspection devices so that the identification data collected previously during the basic identification may be immediately reused during the additional subsequent identification.

Subsequently, first additional identification data of the motor vehicle, which are specific to a first motor vehicle inspection device, and, if necessary, additional second identification data of the motor vehicle, which are specific to a second motor vehicle inspection device, are ascertained.

Since several motor vehicles are inspected in a repair shop or an inspection station, the identification data are supplemented by a characteristic which distinctly identifies the motor vehicle. This characteristic enables the identification of the identification data which have previously been collected on the motor vehicle during the repair shop visit.

The characteristic, the basic identification data, the first additional identification data, and the second additional identification data are stored on a storage medium. In this way, the reuse of the stored data by different inspection devices is advantageously ensured during an inspection procedure in that the inspection devices may access all identification data which are stored on the storage medium.

The storage medium is advantageously a central server which is connected to the individual inspection devices via a repair shop or an inspection station network. Alternatively, it is also possible to use an RFID tag as the storage medium which is attached to the particular motor vehicle. One advantage which results due to storing the identification data on a storage medium is that the identification data of the motor vehicle may be stored permanently beyond the present repair shop visit or the inspection procedure. The identification data may be stored in a customer or a motor vehicle database for future repair shop visits or inspection procedures.

In addition to the first and the second additional identification data which are specific to the individual inspection devices, third additional identification data may also be ascertained, which are specific to a subgroup of the different inspection devices across the relevant inspection devices. The group-specific subsequent identification is carried out uniformly in the inspection devices which are assigned to this subgroup. The third additional identification data are also stored on the storage medium.

One advantage of the method according to the present invention is that not all characteristics of the motor vehicle identification must be standardized, in particular not those of the specific additional identification data (subsequent identification) which are specific only to individual inspection devices.

The exemplary embodiments and/or exemplary embodiments of the present invention furthermore provide a motor vehicle inspection device according to the description herein which is configured to use basic identification data of the motor vehicle for the identification of a specific motor vehicle, and the first additional identification data of the motor vehicle, which are specific to the motor vehicle inspection device, for the operation on a motor vehicle. For this purpose, the motor vehicle inspection device may retrieve the already existing identification data from a storage medium, such as a central server or an RFID tag, via a repair shop or an inspection station network.

Finally, the exemplary embodiments and/or exemplary embodiments of the present invention provide a system for identifying motor vehicles according to the description herein having a plurality of motor vehicle inspection devices and a storage medium on which the basic identification data of a motor vehicle and a plurality of the first identification data are stored, each piece of data being specific to one of the plurality of motor vehicle inspection devices; for the operation on a motor vehicle, the motor vehicle inspection devices are configured to retrieve the basic identification data of the motor vehicle and the first identification data, which are specific to the particular motor vehicle inspection device, from the storage medium.

Refinements are the subject matter of the particular descriptions herein.

Further features and advantages of specific embodiments of the present invention result from the following description with reference to the appended drawings.

BRIEF DESCRIPTION OF THE DRAWINGS

FIG. 4 shows a schematic representation of the sequence of a method for identifying a motor vehicle during a repair shop or an inspection station visit according to another specific embodiment of the present invention.

DETAILED DESCRIPTION

In the sense of this application, the motor vehicle inspection devices are not limited to specific motor vehicle inspection devices. They may, for example, include axle measurement testers, engine testers, emission testers, brake testers, shock absorber testers, track testers, weighing devices, brake fluid testers, sound level meters, diesel exhaust gas testers, chassis measuring devices, toe angle measuring devices, steering angle testers, air conditioner testing devices, and the like.

Figure 1:
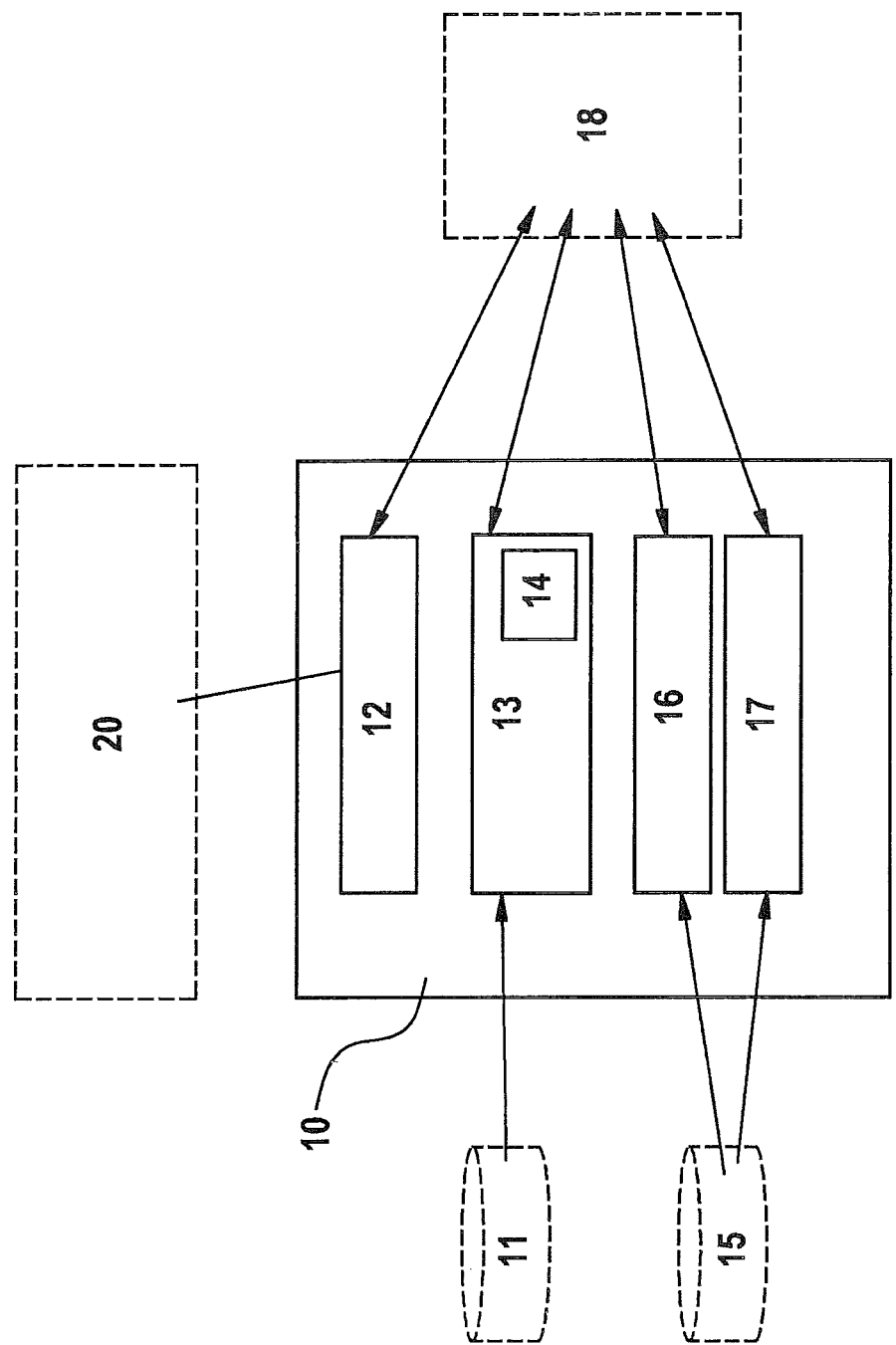
FIG. 1 shows a schematic representation of a motor vehicle inspection device according to one specific embodiment of the present invention.

FIG. 1 shows a schematic representation of a motor vehicle inspection device according to one specific embodiment of the present invention.

A motor vehicle inspection device 10 is shown. Motor vehicle inspection device 10 may be an engine tester, for example. For functional operation, motor vehicle inspection device 10 needs identification data of the motor vehicle to be inspected. The identification data include general motor vehicle identification data 13 which are relevant to all inspection devices. General comprehensive motor vehicle identification data 13 may, for example, include the make, the manufacturer, the vehicle type, the vehicle design, and the like. General motor vehicle identification data 13, which are relevant to all inspection devices, may be combined into basic identification data 13 and standardized for all different inspection devices. A basic identification database 11 may be used to ascertain these basic identification data 13.

Furthermore, the identification data include a specific identification data portion 17 which is specific to motor vehicle inspection device 10. An engine tester, for example, needs the specification of the type of the engine or the ignition sequence for proper operation. Specific identification data portion 17 here includes all specifications which are specific to particular motor vehicle inspection device 10, here the engine tester, and are not necessarily needed for any other motor vehicle inspection device. Specific identification data portions 17 do not have to be standardized and may remain specific to particular motor vehicle inspection device 10.

Moreover, the identification data include a specific identification data portion 16 which is also needed for the operation of motor vehicle inspection device 10. In contrast to specific identification data portion 17, the identification data of identification data portion 16 are, however, very similar to the identification data which are also needed for the operation of other motor vehicle inspection devices. Specific identification data portion 16 thus represents a product group-specific identification data portion which may be combined with similar portions of other motor vehicle inspection devices into a product group-specific subsequent identification data and which may be standardized. For an engine tester, for example, the specification of the cylinder number and the fuel used represent such a specific identification data portion 16, since the specification of the cylinder number and the fuel used are, for example, also needed for the operation of an emission tester. An engine tester and an emission tester are thus combined to form one joint inspection device group, and the specifications of the cylinder number and the fuel used may be standardized for all inspection devices of this inspection device group. It should be obvious for those skilled in the art that additional inspection device groups may be formed with other inspection devices and additional corresponding product group-specific identification data. Furthermore, it is possible that individual motor vehicle inspection devices are assigned to multiple different inspection device groups for each of which different identification data portions 16 may be formed. An inspection device-specific identification database 15 may be used to ascertain these identification portions 16 and 17.

To ensure that the data of all identification data portions 13, 16, and 17 for inspection device 10 and all other different inspection devices are stored together, basic identification data 13 of a motor vehicle include a distinct vehicle key 14, for example, vehicle key "8K2-B8" for an "AUDI A6 Avant." Vehicle key 14 may be supplemented automatically from basic identification database 11. This distinct vehicle key 14 forms the bridge between the data of different identification databases 15 of the different inspection devices. For this purpose, the vehicle-specific identification data in inspection device-specific identification databases 15 are assigned to one or multiple vehicle keys 14, a uniform set of vehicle keys 14 being used in all identification databases 15. Uniform vehicle key 14 enables a fast access to the specific contents of specific identification database 15 of this inspection device and the start of the subsequent identification when a subsequent identification is carried out during the repair shop visit using a different inspection device.

In the repair shop or the inspection station, ascertained identification portions 13, 16, and 17 are unambiguously assigned to a specific motor vehicle 20 due to at least one distinct characteristic of specific motor vehicle 20. This identification characteristic is introduced as identification portion 12 and may include the motor vehicle license number, the vehicle identification number, a manufacturer's serial number, a customer number, or a similar characteristic, or a combination of these characteristics which make an unambiguous association with motor vehicle 20 possible. Ascertained identification portions 13, 16, and 17 form together with identification characteristic 12 the vehicle identification data set for inspection device 10 and for other inspection devices used during the repair shop visit.

Transferring identification data from one inspection device to another during the repair shop visit may thus be carried out via:
- identification characteristic 12 of the specific motor vehicle
- uniform basic identification 13 supplemented by a uniform vehicle key 14
- storing all vehicle identification data in one uniform form in one storage medium 18 which may be read out by all inspection devices
- reading in of the stored vehicle identification data and
- using a set of uniform vehicle keys in all inspection device-specific identification databases.

All identification data 12, 13, 16, and 17 are stored on a storage medium 18 for the transfer to other inspection devices. Storage medium 18 may be a central server in a repair shop or an inspection station internal network, an RFID tag, or a similar medium for storing motor vehicle data. Motor vehicle inspection device 10 is configured to read out identification data 12, 13, 16, and 17 from storage medium 18 and to store potentially newly detected identification data on storage medium 18. The read-out and storage take place according to methods known to those skilled in the art, such as the wireless or wired data exchange. If identification data for multiple motor vehicles are stored on storage medium 18, motor vehicle inspection device 10 may furthermore be configured in such a way that the vehicle identification data set being associated with the motor vehicle and including identification data 12, 13, 16, and 17 is to be selected from multiple vehicle identification data sets present on storage medium 18 based on unambiguous identification characteristic 12.

Since the basic identification of a motor vehicle should be possible at every workstation of the repair shop or the inspection station, each inspection device may be equipped with basic identification database 11 or basic identification database 11 is installed on the central server in the repair shop or the inspection station, and all inspection devices may access this central basic identification database 11 via an internal network for the purpose of basic identification of a motor vehicle. It may also be possible to be able to access a basic identification database 11 outside the repair shop or the inspection station, e.g., via the Internet.

Inspection device-specific databases 15 may be integrated into their particular inspection devices. Alternatively, it is also possible here to install inspection device-specific databases 15 on a central server in the repair shop or the inspection station, and all inspection devices may access these inspection device-specific databases 15 via an internal network. It may also be possible to be able to access inspection device-specific databases 15 outside the repair shop or the inspection station, e.g., via the Internet.

Figure 2:
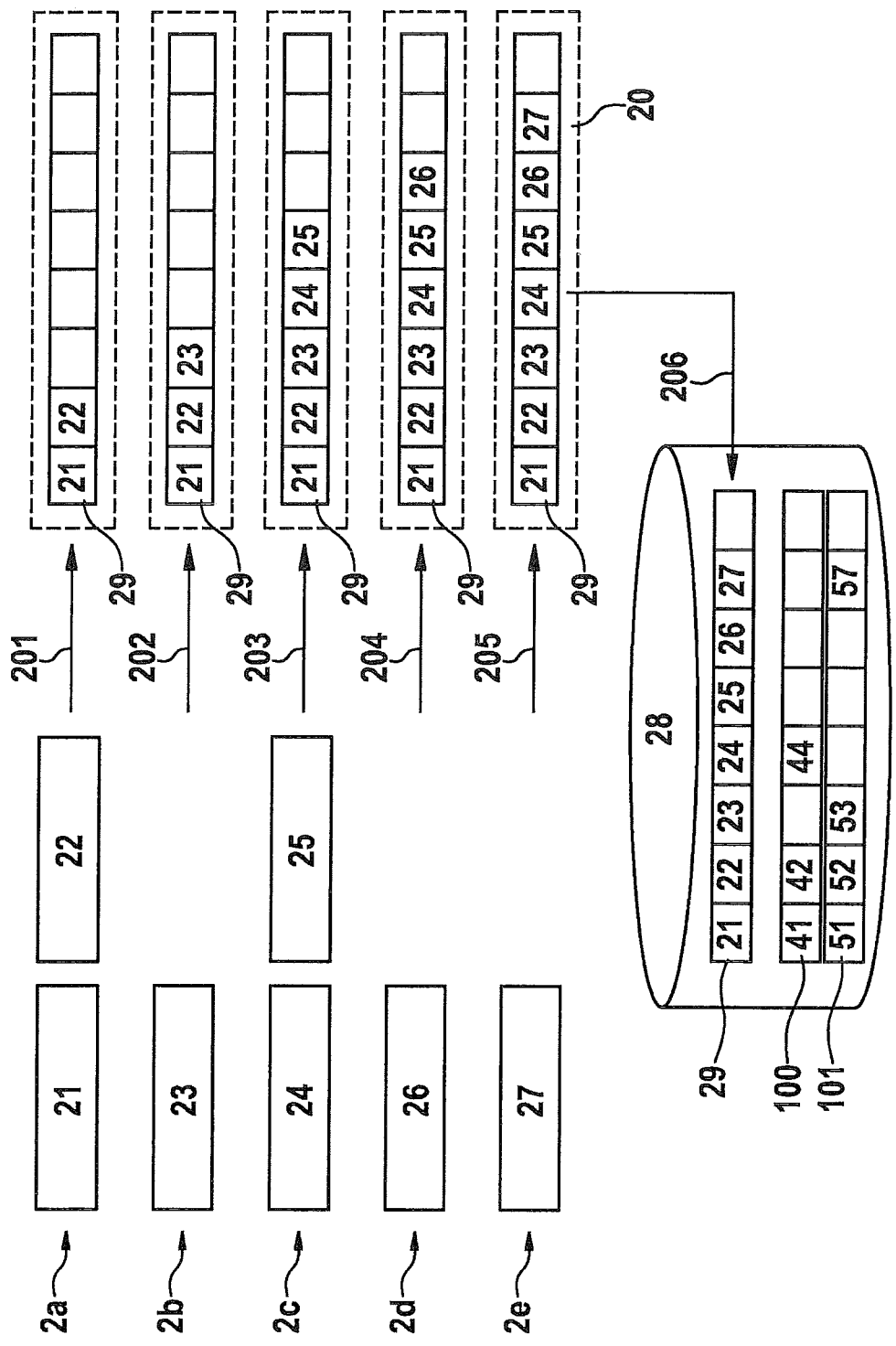
FIG. 2 shows a schematic representation of the sequence of a method for identifying a motor vehicle according to another specific embodiment of the present invention.

FIG. 2 shows a schematic representation of the sequence of a method for identifying a motor vehicle for a repair shop or an inspection station visit according to one specific embodiment of the present invention. The explanations regarding FIG. 2 partly draw on the representation from FIG. 4, where a schematic representation of the sequence of a method for identifying a motor vehicle 41 during a repair shop visit using multiple different inspection devices is shown according to one specific embodiment of the present invention.

As shown in FIG. 4, a step 2a is advantageously carried out at the start of inspection procedure 40 of a motor vehicle 41. For example, a data set 29 is initialized on motor vehicle 41 using a suitable identification characteristic 21, e.g., the motor vehicle license number, the vehicle identification number, the manufacturer's serial number, or the like, with the aid of a PC 42a at the workstation of vehicle drop-off 42 of a repair shop or with the aid of a central control computer of a test lane 42a installed there. Additionally, in first step 2a of a repair shop visit in FIG. 2, basic identification data 22 having an automatically appended uniform vehicle key of a motor vehicle 41 (see FIG. 4) are ascertained with the aid of a basic identification database (not illustrated). These second vehicle identification data 22 are supplemented in initialized data set 29, and data set 29 is stored on a storage medium 20 in a storage step 201. Here, storage medium 20 may represent a central server, an RFID tag, or a comparable storage medium similar to storage medium 18 in FIG. 1. At vehicle drop-off 42, additional steps of the inspection procedure 40 may optionally be carried out, such as a brake inspection or a rapid diagnostic test which presently do not require any further vehicle identification.

In a second step 2b in FIG. 2, a first inspection 43 (see FIG. 4), e.g., a diagnosis using a control diagnostic tester 43a, is carried out on motor vehicle 41. First inspection 43 may be carried out at one workstation in the repair shop. For this purpose, data set 29 stored in first step 2a is identified by control unit diagnostic tester 43a based on identification characteristic 21 in storage medium 20, read in from storage medium 20, and a subsequent identification is carried out for the control unit diagnosis using these data and using the control unit diagnostic identification database (not shown). Within the scope of this subsequent identification, basic identification data 22, in particular, having the vehicle key are used, and additional identification data 23 are collected which are necessary for the control unit diagnosis. Identification data 23 are appended to read-out data set 29, which already contains identification characteristic 21 and basic identification data 22, and expanded data set 29 is stored on storage medium 20 in a storage step 202. Here, previous data set 29 may be overwritten by new data set 29.

In a third step 2c in FIG. 2, a second inspection 44 (see FIG. 4), e.g., an emission test using an emission tester 44a, is carried out on motor vehicle 41. Second inspection 44 may be carried out at the same workstation as first inspection 43 or at another workstation in the repair shop. For this purpose, identification data set 29 stored in second step 2b is identified by emission tester 44a based on identification characteristic 21 in storage medium 20, and entire data set 29 is read in from storage medium 20. Now, a subsequent identification, which is specific to emission tester 44a is carried out, and identification data 24 are ascertained with the aid of the read-out identification data and the emission test identification database (not shown), for example, the cylinder number of motor vehicle 41 to be inspected. The cylinder number is also needed for an engine test which follows the emission test; therefore, identification data 24 are assigned to the group of product group-specific identification data, which are specific to a subgroup of inspection devices, here, for example, emission tester 44*a* and engine tester 45*a* (see FIG. 4).

Moreover, identification data 25, which are specific exclusively to the emission test, are ascertained and are thus assigned to the inspection device-specific identification data. Both product group-specific identification data 24 and inspection device-specific identification data 25 are added to read-out data set 29 for motor vehicle 41, and supplemented data set 29 is stored on storage medium 20 in a storage step 203, thus potentially overwriting previous data set 29.

In a fourth step 2*d* in FIG. 2, a third inspection 45 (see FIG. 4), e.g., an engine test using an engine tester 45*a*, is carried out on motor vehicle 41. The product group-specific subsequent identification data are already available on storage medium 20 so that, after identifying and reading out data set 29, the cylinder number in this case, for example, no longer has to be ascertained separately, but may be retrieved from identification data 24. Additional inspection device-specific identification data 26, which are specific to engine tester 45*a*, are then ascertained using the engine test identification database (not shown). Inspection device-specific identification data 26 are added to read-out data set 29, i.e., to the already present identification data 21 through 25, and supplemented data set 29 is stored on storage medium 20 in a storage step 204. Data set 29 which has previously been present in storage medium 20 for motor vehicle 41 may be replaced by new data set 29 in the process.

In a fifth step 2*e* in FIG. 2, a fourth inspection 46 (see FIG. 4), e.g., a chassis measurement using a chassis tester 46*a*, is carried out on motor vehicle 41. Using chassis tester 46*a*, identification data set 29 stored in fourth step 2*d* is identified based on identification characteristic 21 in storage medium 20, and entire data set 29 is read in from storage medium 20. Using the read-out identification data, in particular identification data 22 having the uniform vehicle key, identification data 27 necessary for the chassis measurement on motor vehicle 41 are ascertained with the aid of the identification database for the chassis measurement (not shown). Inspection device-specific identification data 27 are added to read-out data set 29 having identification data 21 through 26, and supplemented data set 29 is stored on storage medium 20 in a storage step 205. Previous data set 29 may be overwritten in the process.

After completing the chassis measurement, a calibration of the steering angle may also be carried out, for example, with the aid of control unit diagnostic tester 43*a*. Using control unit diagnostic tester 43*a*, data set 29 may be identified in storage medium 20 and read out from storage medium 20 together with identification data 21 through 27. For control unit diagnostic tester 43*a*, all necessary identification data 21, 22, and 23 may already be available in data set 29 on storage medium 20 so that no further inspection device-specific subsequent identification is needed. Necessary identification data 22 and 23 may be automatically extracted, and a steering angle calibration may be carried out without the previously needed working step of vehicle identification.

After completing repair shop visit 40, ascertained identification data set 29 may be transferred to a customer or repair shop database 28 in a storage step 206 and is thus available as new customer data set 29 for specific motor vehicle 41 for potential future repair shop visits or inspection procedures. Customer data set 29 may also contain additional information regarding specific vehicle 41, such as the inspection results, as has been the case hitherto. Customer data sets which have been possibly stored previously in the repair shop database and which include identification data 41, 42, 44 and 51, 52, 53 and 57 are labeled with reference numerals 100 and 101.

Figure 2A:
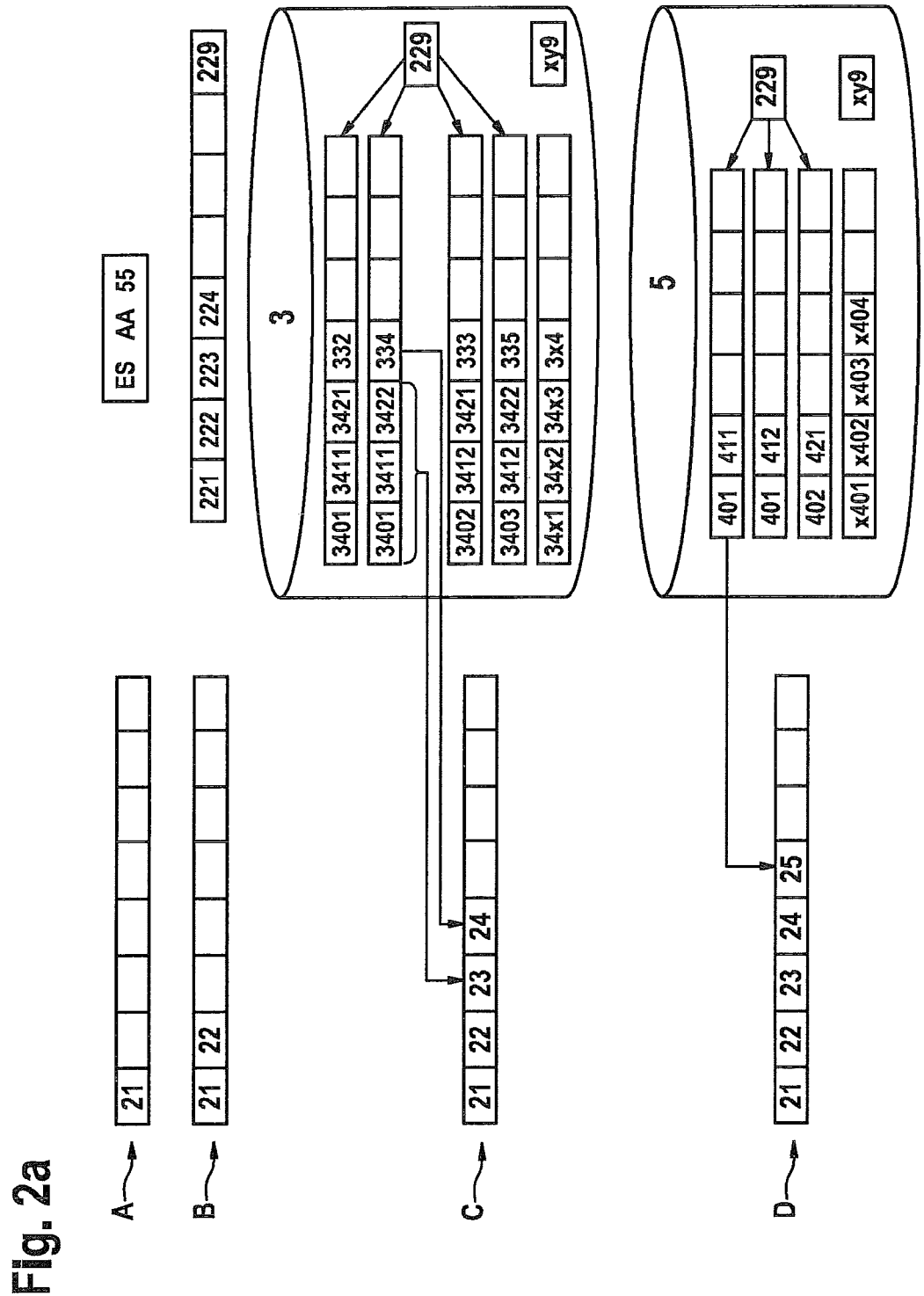
FIG. 2a shows a schematic representation of the sequence of a method for identifying a motor vehicle according to another specific embodiment of the present invention.

FIG. 2*a* shows a schematic representation of the sequence of a method for identifying a motor vehicle according to another specific embodiment of the present invention.

In a first step A, an identification characteristic 21 is ascertained which is unambiguous for a specific motor vehicle, here, for example, the motor vehicle license number. Identification characteristic 21 represents a first identification data portion in the identification data set.

In a second step B, the basic identification of the motor vehicle is carried out. For this purpose, basic identification data 22 may include multiple basic identification data portions 221 through 224, for example, 221 for the motor vehicle make, e.g., "Audi," 222 for the series, e.g., "A6," 223 for the type, e.g., "Avant," and 224 for the model year, e.g., "2009." It is understood that yet other basic identification data portions may be added to basic identification data 22. Finally, data-based vehicle key 229 is appended which is associated with the entirety of this basic identification data and has content "8K2-B8" as an example. Basic identification data 22 may be retrieved from a basic identification database.

In a third step C, product group-specific identification data 23 and inspection device-specific identification data 24 are collected. For example, product group-specific identification data 23 and inspection device-specific identification data 24 may be retrieved from an engine test identification database 3. Here, identification data sets which are identifiable via vehicle key 229 are stored in engine test identification database 3. In engine test identification database 3, yet other identification data sets may be stored which are identifiable via other vehicle keys xy9. For product group-specific identification data 23, product group-specific identification data may now be adopted from engine test identification database 3 for the swept volume, for example, 3401 for "2 liters," 3402 for "2.4 liters," or 3403 for "2.7 liters," for example, for the cylinder number, 3411 for "4" or 3412 for "6," for example, and for the fuel type 3421 for "gasoline" or 3422 for "diesel," for example. In the present example, data 2 liters swept volume, 4 cylinders, and fuel type diesel are transferred into the identification data set from engine test identification database 3.

These product group-specific identification data may also be adopted in a similar manner from emission identification database 4 (not illustrated) which is why it is labeled here with reference symbol "34xx."

For inspection device-specific identification data 24, inspection device-specific identification data may be adopted from engine test identification database 3 for the injection system, for example, 331 for injection system "intake manifold injection MExx," 332 for injection system "gasoline direct injection MExy," 333 for injection system "gasoline direct injection MEyx," 334 for injection system "common rail MEyx," or 335 for injection system "common rail MEyy." In the present example, data injection system "Common Rail MEyx" are transferred into the identification data set from engine test identification database 3.

In a fourth step D, other inspection device-specific identification data 25 are collected here, for example, inspection device-specific identification data by the example of identification database 5 for the chassis measurement. In this case, identification data sets which are identifiable via vehicle key 229 are stored in identification database 5 for the chassis measurement. In identification database 5 for the chassis measurement, yet other identification data sets may be stored which are identifiable via other vehicle keys xy9. For inspection device-specific identification data 25, inspection device-specific identification data may be adopted from identification database 5 for the chassis measurement, for example, data for the chassis, e.g., 401 for chassis "normal" or 402 for "sport suspension," data for spring type, e.g., 411 for "steel spring" or 412 for "air spring," and other data, e.g., 421 for a "level control at the rear axle." In the present case, data 401 for chassis "normal" and 411 for spring type "steel spring" are adopted in the identification data set.

Figure 3:
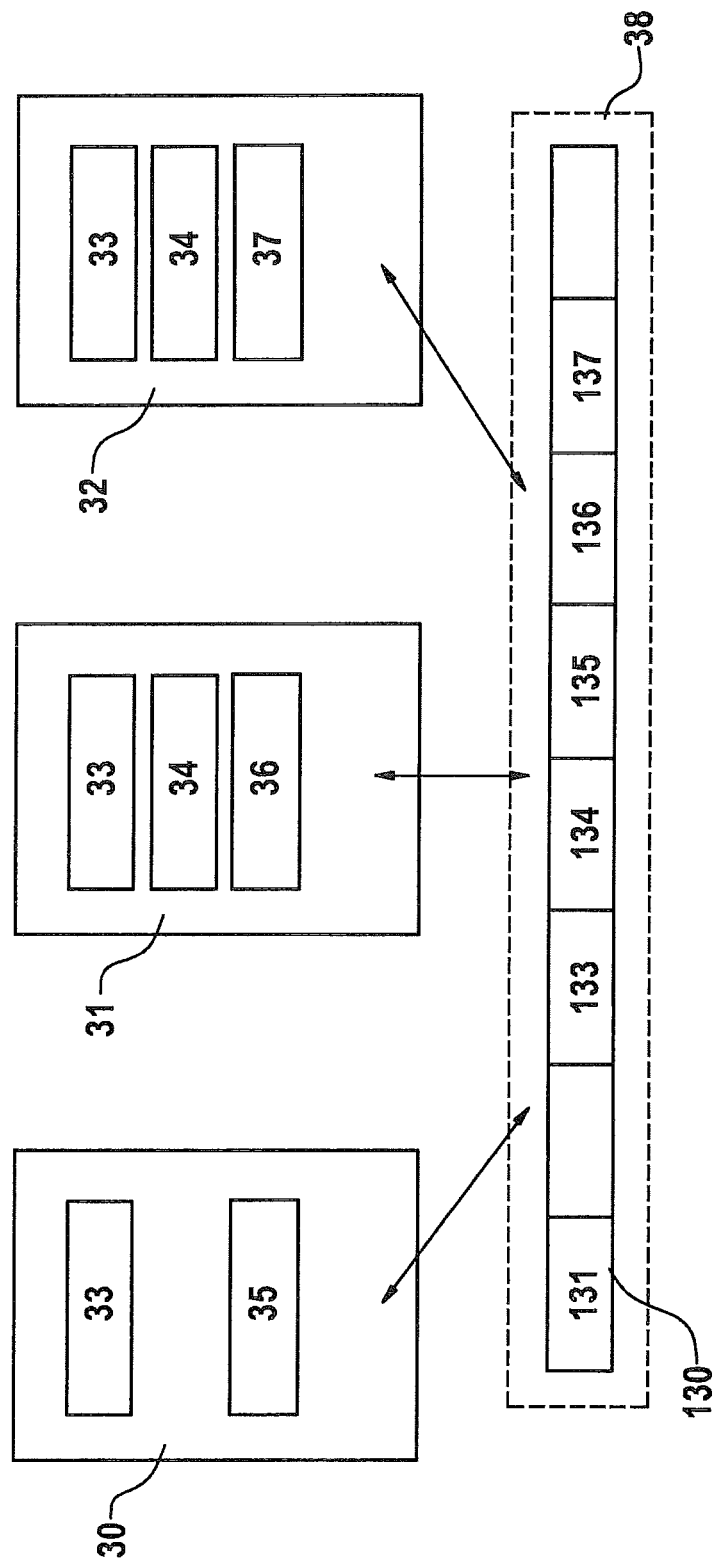
FIG. 3 shows a schematic representation of a system for identifying motor vehicles according to another specific embodiment of the present invention.

FIG. 3 shows a schematic representation of a system for identifying motor vehicles for motor vehicle inspection devices 30, 31, and 32 according to one specific embodiment of the present invention. Motor vehicle inspection device 30 is, for example, an axle measurement tester, motor vehicle inspection device 31 is, for example, an engine tester, and motor vehicle inspection device 32 is, for example, an emission tester. It is understood that the functional assignment of the motor vehicle inspection devices in FIG. 3 is merely exemplary, and motor vehicle inspection devices 30, 31, and 32 may also represent other motor vehicle inspection devices. The number of different inspection devices in the system for identifying motor vehicles may also vary.

For the operation, motor vehicle inspection device 30 requires first general comprehensive motor vehicle identification data, motor vehicle inspection device 31 requires second general comprehensive motor vehicle identification data, and motor vehicle inspection device 32 requires third general comprehensive motor vehicle identification data. The intersection of the general comprehensive motor vehicle identification data is standardized and combined into basic identification data 33, which are uniform for all motor vehicles, for motor vehicle inspection devices 30, 31, and 32. For this purpose, the number, the content, and the structure of the motor vehicle data combined into basic identification data 33 as well as a uniform vehicle key for differentiating all basic identification data sets are standardized, in particular. All basic identification data sets may be combined into one basic identification database which is uniform for all inspection devices. This basic identification database may be installed on every inspection device and/or on a central server in the repair shop or outside the repair shop. Remote access to the server from the inspection device may be available in the case of a server installation.

Moreover, particular motor vehicle inspection devices 30, 31, and 32 need inspection device-specific identification data 35, 36, and 37, respectively, which are each necessary for operating the particular motor vehicle inspection device. These inspection device-specific identification data 35, 36, and 37 do not necessarily have to be standardized since they are not needed for all inspection devices. For the state following the standardization of the vehicle identification, every inspection device-specific identification data set is to be additionally marked using the uniform vehicle key of the basic identification in order to enable an automatic exchange of identification data via this vehicle key between different motor vehicle inspection devices 30, 31, and 32 or their specific identification databases. All inspection device-specific identification data sets are combined into one identification database, which is specific for the particular inspection device. For example, this would be an identification database for axle measurement in the case of inspection device 30, an engine test identification database for inspection device 31, and an emission test identification database for inspection device 32. These inspection device-specific identification databases may be installed on the particular inspection device or on a central server in the repair shop or outside the repair shop. Remote access to the server from the inspection device may be available in the case of a server installation.

In addition, individual motor vehicle inspection devices may be combined to form subgroups when they need identification data which are identical or very similar structurally and conceptually. Here, motor vehicle inspection device 31 and motor vehicle inspection device 32, for example, need identification data which are similar and have the same meaning. These identification data are combined into product group-specific identification data 34 and are assigned to a subgroup of motor vehicle inspection devices which are formed here by motor vehicle inspection devices 31 and 32, as an example. These product group-specific identification data 34, however, each represent a matching subset of the identification data of the engine tester and the emission tester identification data sets, here as examples, which are stored in a standardized form as product group-specific identification data 34, in addition to inspection device-specific identification data 36 or 37, in the provided range of the vehicle identification data. Therefore, no additional identification database is needed.

Of course, it is also possible for other motor vehicle inspection devices to belong to a subgroup and/or for one individual motor vehicle inspection device to be assigned to multiple subgroups. Product group-specific identification data 34 are standardized to particular motor vehicle inspection devices 31 and 32 of the assigned subgroup.

In FIG. 3, an identification data set 130 is formed, as an example, for a specific motor vehicle including the following steps:

A new identification data set 130 having one distinct characteristic 131 of the motor vehicle is initialized by any inspection device 30, 31, or 32 or from a normal repair shop PC (not illustrated). Subsequently, basic identification data 133 are ascertained, which may be using the same inspection device, with the aid of the basic identification database, and identification data set 130 is stored on a storage medium 38 for the continued repair shop visit. In the sequence of the repair shop visit resulting from practical considerations, product group-specific identification data 134 and inspection device-specific identification data 135, 136, and 137 are ascertained with the aid of the identification database for axle measurement, the engine test identification database, and the emission test identification database, and each of the supplemented identification data sets is stored on storage medium 38 in a successively updated manner. Similar to storage medium 20 in FIG. 2 or storage medium 18 in FIG. 1, storage medium 38 may be a central server or an RFID tag, for example. Particular motor vehicle inspection devices 30, 31, and 32 may draw on the data sets stored on storage medium 38 both in a read and write access. In this way, motor vehicle inspection device 31 may, for example, identify on storage medium 38 identification data set 130 for motor vehicle 41 with the aid of identification characteristic 141, read in identification data set 130, and obtain all identification data necessary for the inspection operation with the aid of basic identification data 133, product group-specific identification data 134, and inspection device-specific identification data 136. Conversely, identification data 133 and 135 already present in another identification data set 130, for example, read-in by motor vehicle inspection device 31, may be supplemented by first-time ascertained identification data, e.g., product group-specific identification data 134 and product-specific identification data 136, and identification data set 130 thus supplemented may be transferred to storage medium 38 in one storage step.

What is claimed is:

1. A method for identifying a motor vehicle for a plurality of motor vehicle inspection devices, the method comprising:
    ascertaining a distinct characteristic of the motor vehicle;
    ascertaining basic identification data of the motor vehicle;
    storing the distinct characteristic and the basic identification data in an identification data set for this motor vehicle on a storage medium;
    identifying the identification data set associated with the motor vehicle on the storage medium with a first of the plurality of motor vehicle inspection devices based on the distinct characteristic;
    reading out the identified identification data set of the motor vehicle from the storage medium;
    ascertaining first identification data of the motor vehicle, which are specific to the first of the plurality of motor vehicle inspection devices;
    supplementing the read-out identification data set by the first identification data;
    storing the supplemented identification data set on the storage medium;
    identifying the identification data set associated with the motor vehicle on the storage medium with a second of the plurality of motor vehicle inspection devices based on the distinct characteristic;
    reading out the identified identification data set of the motor vehicle from the storage medium;
    ascertaining second identification data of the motor vehicle, which are specific to the second of the plurality of motor vehicle inspection devices;
    supplementing the read-out identification data set by the second identification data; and
    storing the supplemented identification data set on the storage medium, wherein at least one of the inspection devices physically measures a vehicle performance characteristic.

2. The method of claim 1, wherein the basic identification data of the identification data set are used to operate all of the plurality of motor vehicle inspection devices, the first identification data only to operate the first of the plurality of motor vehicle inspection devices, and the second identification data only to operate the second of the plurality of motor vehicle inspection devices.

3. The method of claim 1, further comprising:
    identifying the identification data set associated with the motor vehicle on the storage medium based on the distinct characteristic with a motor vehicle inspection device associated with a subgroup of motor vehicle inspection devices;
    reading out the identified identification data set of the motor vehicle from the storage medium;
    ascertaining third identification data which are specific to the subgroup of motor vehicle inspection devices;
    supplementing the read-out identification data set by the third identification data;
    storing the supplemented identification data set on the storage medium; and
    using the third identification data only to operate all inspection devices of the subgroup of motor vehicle inspection devices.

4. The method of claim 1, wherein the storage medium is a central server or an RFID tag.

5. The method of claim 1, wherein, when the identification data set is stored, the identification data set stored previously on the storage medium is overwritten.

6. A motor vehicle inspection device, which, for the operation on a motor vehicle for identifying the motor vehicle, comprising:
    an arrangement configured to use a distinct characteristic of the motor vehicle, basic identification data of the motor vehicle, and first identification data of the motor vehicle, which are specific for the motor vehicle inspection device, including:
    an identifying arrangement for identifying the identification data set associated with the motor vehicle on the storage medium based on the distinct characteristic;
    a read-out arrangement for reading out the identified identification data set of the motor vehicle from the storage medium;
    a determining arrangement for determining first identification data of the motor vehicle, which are specific for the motor vehicle inspection device;
    a supplemental arrangement for supplementing the read-out identification data set by the first identification data;
    a storing arrangement for storing the supplemented identification data set on the storage medium; and
    an arrangement for physically measuring a vehicle performance characteristic.

7. The motor vehicle inspection device of claim 6, which, for the operation on the motor vehicle, is configured to use second identification data of the motor vehicle, which are specific to a group of inspection devices to which the motor vehicle inspection device is assigned.

8. The motor vehicle inspection device of claim 6, wherein the motor vehicle inspection device obtains at least one of the distinct characteristic of the motor vehicle, the basic identification data, the first identification data, and the second identification data from a central server or an RFID tag.

9. A system, comprising:
    a plurality of motor vehicle inspection devices, each inspection device being configured for physically measuring a vehicle performance characteristic; and
    a storage medium on which a distinct characteristic and basic identification data of a motor vehicle and a plurality of first identification data, which are each specific to one of the plurality of motor vehicle inspection devices are stored, the motor vehicle inspection devices being configured, for the operation on a motor vehicle, to identify the basic identification data of the motor vehicle and first identification data, which are specific for the particular motor vehicle inspection device, based on the distinct characteristic and to retrieve them from the storage medium,
    wherein at least one of the motor vehicle inspection devices includes a motor vehicle inspection device, which, for the operation on a motor vehicle for identifying the motor vehicle, includes:
    an arrangement configured to use a distinct characteristic of the motor vehicle, basic identification data of the motor vehicle, and first identification data of the motor vehicle, which are specific for the motor vehicle inspection device, including:
    an identifying arrangement for identifying the identification data set associated with the motor vehicle on the storage medium based on the distinct characteristic;
    a read-out arrangement for reading out the identified identification data set of the motor vehicle from the storage medium;
    a determining arrangement for determining first identification data of the motor vehicle, which are specific for the motor vehicle inspection device;

a supplemental arrangement for supplementing the readout identification data set by the first identification data; and a storing arrangement for storing the supplemented identification data set on the storage medium.

10. The system of claim 9, wherein on the storage medium, a plurality of second identification data, which are each specific to a subgroup of the plurality of motor vehicle inspection devices, are stored, and the motor vehicle inspection devices, for the operation on the motor vehicle, are configured to identify the second identification data, which are specific to the subgroup to which the motor vehicle inspection device is assigned, based on the distinct characteristic and to retrieve them from the storage medium.

11. The system of claim 9, wherein the storage medium is a central server or an RFID tag.

* * * * *